June 12, 1962  J. A. O'CONNELL ETAL  3,039,005
ELECTRO-OPTICAL DEVICE

Filed April 8, 1960

TIME

INVENTORS
JAMES A. O'CONNELL
BERNT NARKEN

BY Carl C. Kling
ATTORNEY

June 12, 1962 J. A. O'CONNELL ETAL 3,039,005
ELECTRO-OPTICAL DEVICE
Filed April 8, 1960
2 Sheets-Sheet 2

3,039,005
ELECTRO-OPTICAL DEVICE
James A. O'Connell and Bernt Narken, Poughkeepsie, N.Y., assignors to International Business Machines Corporation, New York, N.Y., a corporation of New York
Filed Apr. 8, 1960, Ser. No. 21,016
6 Claims. (Cl. 250—213)

This invention relates to optical logic devices, and more particularly to a device which operates responsive to electrical or optical control inputs and produces electrical or optical outputs.

In a known optical latch circuit, sometimes called "optron," an electroluminor (EL) in electrical series with an optically coupled photoconductor (PC) is adapted to be turned on by a luminant input to the PC. The input lowers the voltage drop across the PC to the level necessary to illuminate the EL, which then through optical feedback keeps the PC at its low resistance level, maintaining the EL luminant. A somewhat similar known device, sometimes called the "persistron," also operates responsive to a light or electrical control input. It produces a light output which decays during a standard delay maintained by the non-saturating feedback.

When such an optical latch or near-latch is merely one of an array of similar devices forming a display, it is advantageous to be capable of turning selected optical units on or off at will by an external light stimulus. Luminant turn-on has long been recognized as inherent in the optical latch. Luminant turn-off, however, has in the prior art been limited to a shunt PC configuration which shorts out the EL or to infrared quenching of the PC.

The phenomenon of photocurrent undershoot has been recognized and explained as typical of cadmium selenide photoconductors. See "Analysis of Photoconductivity Applied to Cadmium Sulfide Type Photoconductors," Journal of Physics and Chemistry of Solids, V. 1, No. 4, Pergamon Press, 1957, pages 234–248 at 246. The essence of photocurrent undershoot is that a photoconductor, when illuminated brighly and suddenly shaded, becomes for a time much more resistive than normal at the shaded light level. Photocurrent "undershoots"; that is, photocurrent drops below the predicted level.

It is the object of this invention to establish a method and means for operating an optical device according to a single source optical input, not only to turn on the device but also to turn it off, by utilizing photocurrent undershoot.

It is an object of the invention to provide means for selectively erasing optical elements in an array.

A more specific object of the invention is to provide means for turning on an optical latch from a short duration light control pulse, and subsequently turning off the latch by means of a longer duration light control pulse from the same source.

It is another specific object of the invention to provide means for darkening a non-saturating feedback optical device selectively for a certain delay period under control of a light pulse directed at it.

A further object of the invention is to provide means for operating optical devices responsive to light inputs of various durations.

Another object of the invention is to provide an optical device having characteristics which make it subject to selective turn-on and erasure by light pulses according to a predetermined pattern of sequence, duration and intensity.

Summary

The optical device of this invention, in order to exhibit the desired luminant turn-on and erasure qualities, requires a luminor and a PC electrically in series and optically coupled for feedback. The PC must exhibit photocurrent undershoot characteristics when illuminated by a luminant control pulse for a duration greater than a standard and then suddenly shaded. The device may be on, with its luminor luminant and feedback occurring; it may be off in which case the control pulse initially turns it on. Further luminant input during the control pulse saturates the PC with current carries of high energy level. When the luminant input is suddenly removed, even though the luminor in the device is active, the PC is shaded, and the high energy current conducting electrons and holes recombine, sweeping the conduction band free of carriers. The current carrying capacity of the PC immediately after the light is rmoved is thus swept below the level at which its luminor normally holds it. This photocurrent undershoot extinguishes the luminor and the device goes off. The luminant input device controls both intensity and duration; a relatively short pulse triggers the optical device on and a relatively longer pulse of the same intensity keeps the device on during its duration, but upon termination causes photocurrent undershoot, sweeping carriers from the conduction band of the PC to momentarily lower PC conductance capability below that necessary to maintain luminance.

The most significant feature of the invention is the extinguishing of an optical feedback device as a result of a control pulse of light. One practical advantage of this feature is that a single light input source can be used to turn the optical device on and also to turn it off.

The foregoing and other objects, features and advatages of the invention will be apparent from the following more particular description of preferred embodiments of the invention, as illustrated in the accompanying drawings.

A high feedback optical latch has sometimes been called the "optron"; the analogous limited feedback optical device may be called the "persistron." Devices according to this invention might be adequately characterized by the terms "optronoff" and "persistroff." The optron is turned on by a light input and latches on due to the high feedback, producing a continuous light output; the optronoff may be latched on by a short light input and unlatched by a subsequent long duration light input. The limited feedback persistron is turned on by a light input and persists on for a standard time duration before going off; the limited feedback persistroff is biased on normally, remains on during an optical input, and goes off at the termination of the optical input, whereupon it persists off for a standard time duration before feedback turns it on again.

Figure 1:
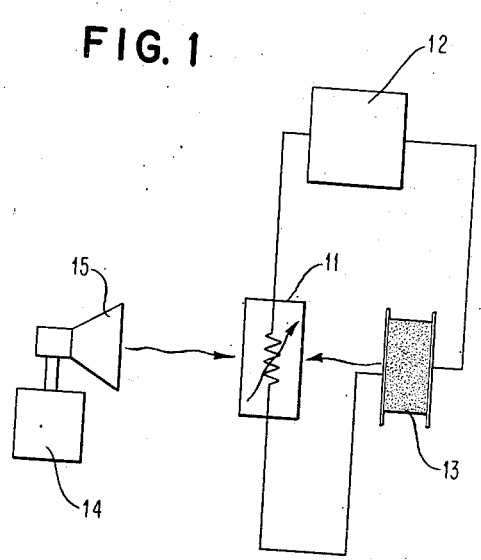
FIG. 1 is a schematic diagram of a preferred embodiment of the invention.
Figure 2:
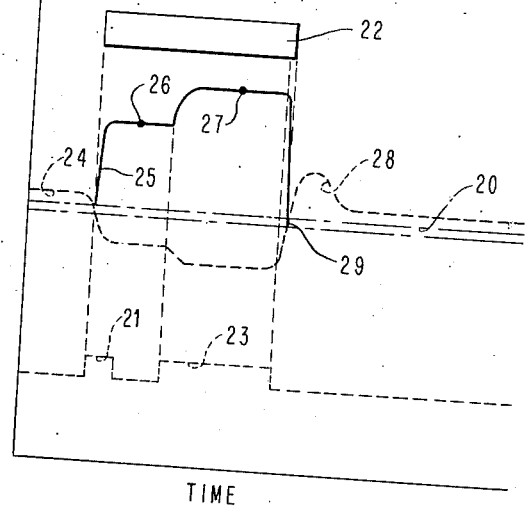
FIG. 2 is a chart of characteristics of the embodiment of FIG. 1. Luminance of input and output and series resistance are shown as a function of time.

FIGS. 1 and 2 demonstrate a saturating feedback optical device according to the invention. PC11 is connected to 200 volt 1000 cycle power source 12 and EL13 which is positioned for saturating optical feedback with PC11. When in the dark, PC11 provides a high resistance in the order of 500 megohms. Footcandle-second timer 14 and light source 15 produce accurately timed optical pulses which are coupled to PC11 to reduce the resistance of PC11 to the order of 500 kilohms. The voltage division across the EL—PC series circuit is thus altered to provide firing voltage to EL13. The EL is optically coupled to PC11 so that after light source 15 is extinguished the EL maintains illumination of the PC for low resistance and the EL remains luminant. The characteristics of the circuit elements used and the physical configuration are maintained so that optical feedback is sufficient to maintain the optical device in the latched condition.

PC11 is a cadmium selenide PC of the type which exhibits photocurrent undershoot when brightly illuminated and then suddenly shaded to an intermediate light level. Cadmium selenide with copper or silver acceptors and chlorine donor levels is preferred. Other cadmium selenide photoconductors are generally acceptable. Cadmium sulfide and other PC compositions which do not exhibit appreciable photocurrent undershoot are generally ineffective at room temperature. At the feedback saturation level of light, photon energy creates electron-hole pairs at the same rate that previous electron-hole pairs recombine. The forbidden band between conduction band and valence band is stable, with holes arrayed along the valence band and electrons in the current band. Additional light from the input creates additional electron-hole pairs. As the input light is shaded, the mobile electrons recombine rapidly with the holes, temporarily sweeping the conduction band completely free of carriers, causing photocurrent undershoot.

Timer 14 causes light source 15 to illuminate PC11 with a short duration standard luminance input pulse 21 (FIG. 2). Due to internal delay, PC11 cannot attain sufficient energy levels to cause photocurrent undershoot when subsequently shaded. As the resistance 24 of PC11 diminishes as a result of the light input, the voltage across EL13 rises above the firing threshold, causing a minimal luminant output 25 which is fed back to PC11. The regenerative feedback during the short input pulse is sufficient to latch the optical device for optical output 22. Output luminance stabilizes at the level of point 26.

When timer 14 causes light source 15 to illuminate PC11 with a longer duration light pulse 23 of standard luminance, carriers in the PC attain high energy levels during the light input. Luminant output rises to the level of point 27. When the light input 23 suddenly is shaded, the carriers sweep the conduction band of PC11 so free of carriers that the photocurrent undershoot phenomenon occurs. Photocurrent undershoot, or more specifically the high resistance 28 which accompanies it, lowers the effective potential across EL13 to a value below the cutoff potential whereupon it is extinguished and the latch condition is lost as luminant output falls below point 29 which is below saturation region 20.

Figure 3:
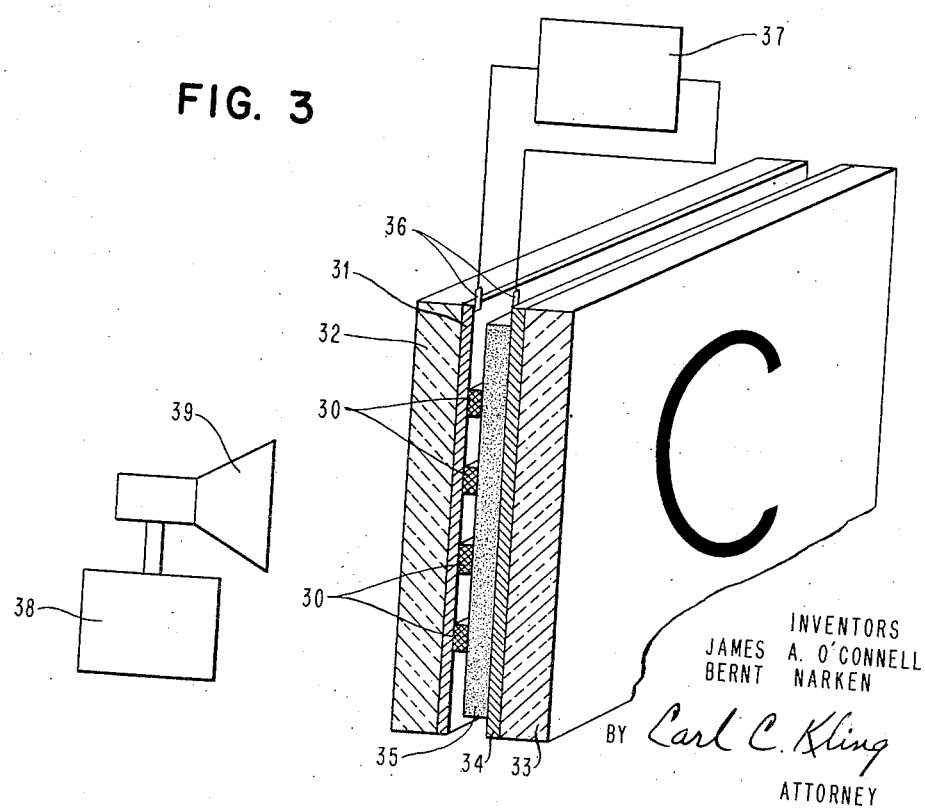
FIG. 3 is a partially sectioned diagrammatic view of a display using a multiplicity of storage display elements according to FIG. 1.

FIG. 3 illustrates a display made up of an array of optical elements each corresponding to the schematic of FIG. 1. Four photoconductive elements 30 are shown arrayed over conductive layer 31 on glass plate 32. A similarly dimensioned glass plate 33, equipped with a conductive coating 34, sandwiches phosphor layer 35 between itself and the array of photoconductors. Contacts 36 connect power source 37 across ELPC sandwich, with elemental areas of EL phosphor layer 35 in electrical series with each of the PC's 30 with optical coupling to the PC's. Each photoconductor and the electroluminescent phosphor in its immediate vicinity form the optical element corresponding to the schematic in FIG. 1. Timer 38 and light source 39 are adapted to selectively illuminate the various photoconductor elements for a short duration to set them or for a longer duration to extinguish them.

A flying spot scanner or cathode ray tube light source can set a complete picture into the optical elements for continuous display on a fast scan. To update the display, areas to be darkened are illuminated during a slow scan for erasure. Alternatively, the entire display may be blanked by a relatively long unfocussed illumination prior to each scan. Another method is a high intensity erasing scan from one source immediately followed by a low intensity writing scan.

Figure 4:
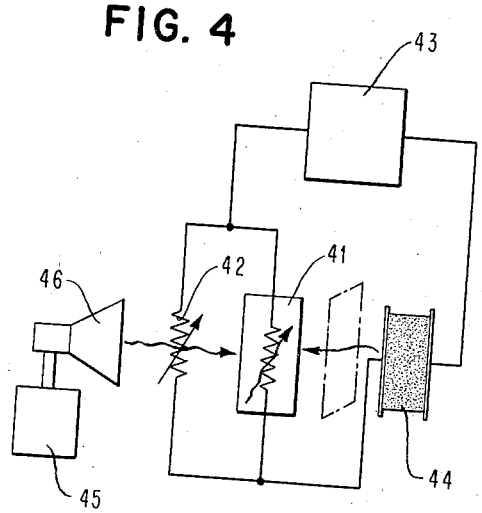
FIG. 4 is a schematic diagram of a limited or slow feedback embodiment of the invention.
Figure 5:
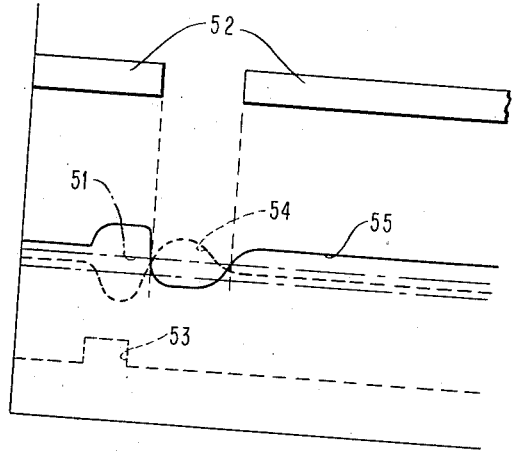
FIG. 5 is a chart of characteristics of the embodiment of FIG. 4.

FIGS. 4 and 5 demonstrate schematically a limited feedback optical device and its parameters. PC41 is maintained at a low dark resistance value in the order of 1 to 2 megohms by shunt resistance 42; one side of the PC and resistance is connected to power source 43. The other side of the PC is connected to EL44 which is positioned for limited optical feedback with PC41. Timer 45 and light source 46 control input illumination. FIG. 4 differs from FIG. 1 only in the addition of variable shunt resistance 42 which is adjusted to place the device just over saturation line 51 (FIG. 5) for normal light output 52.

Figure 6:
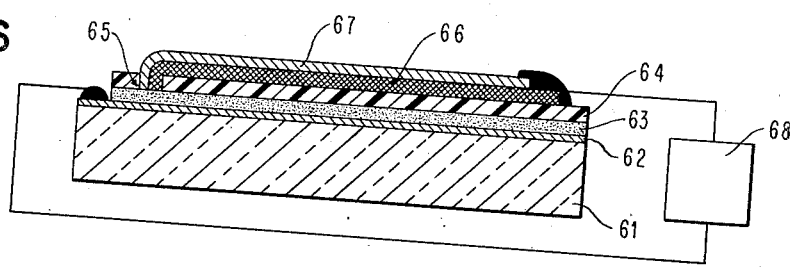
FIG. 6 is a structural diagram of the FIG. 4 embodiment.

FIG. 6 is a structural diagram of the device of FIG. 4. Glass plate 61 is coated with a transparent conductive electrode forming layer 62 of tin oxide. EL layer 63 covers layer 62 and is in turn covered by insulator layer 64 except at a small hole 65. PC66 is deposited over insulator 64 and through hole 65 where it makes series connection with EL layer 63. Tin oxide layer 67, of bulk calculated to produce dark resistivity of the order of 1 to 2 megohms, is positioned over PC66, making contact with EL63 through hole 65. Connection of power supply 68 makes the device correspond to the schematic diagram of FIG. 4.

When PC41 is illuminated by a light pulse 53, carriers in the PC attain high energy levels. When light pulse 53 ends, the high energy carriers sweep the PC conduction band so free of carriers that resistance 54 momentarily rises above the saturation region 51 to shade the device and provide an interruption in the otherwise continuous high intensity output. The device persists off only momentarily, for as the PC returns toward its normal resistance value it returns to saturation region 51. Feedback recurs and output reappears.

Figure 7:
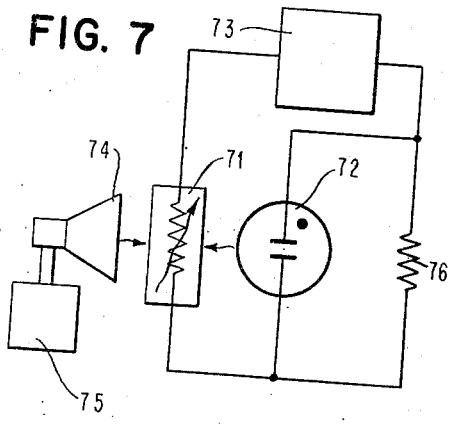
FIG. 7 is a schematic diagram of a neon-photoconductor embodiment of the invention.
Figure 8:
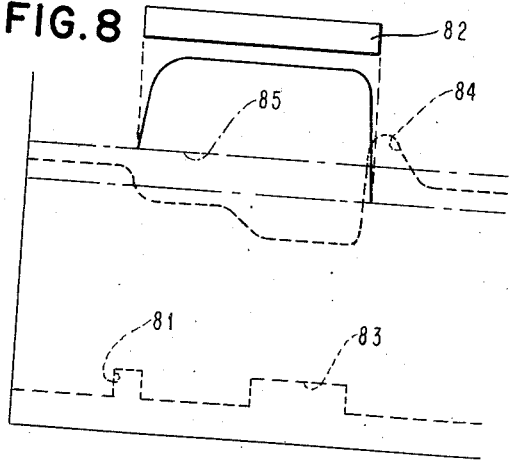
FIG. 8 is a chart of characteristics of the embodiment of FIG. 6.

FIGS. 7 and 8 demonstrate schematically a neon-PC embodiment analogous to the ELPC embodiment of FIG. 1. PC71 forms a series resistance divider with neon 72 and power source 73. The resistance of the divider varies from intermediate to low according to optical inputs to PC71 from lamp 74 as controlled by timer 75. Neon 72 is in series with the resistance divider network and is adapted to fire when PC71 is illuminated. As neon 72 fires, it illuminates PC71, to maintain the resistance divider voltage drop below neon cutoff level and to latch the optical device on. Megohm range resistance 76 across neon 72 establishes firing potential.

PC71 is a cadmium selenide photoconductor with optical undershoot properties similar to that of PC11 in FIG. 1. The device turns on as a result of a short duration pulse; it turns off at termination of a longer duration pulse which causes photocurrent undershoot.

Timer 75 causes light source 74 to illuminate PC71 with a short duration standard luminosity input pulse 81 (FIG. 8). PC71 cannot attain sufficient energy levels to cause photocurrent undershoot when subsequently shaded. As the resistance of PC71 diminishes during pulse 81, the voltage across neon 72 is raised. Light output 82 occurs when the voltage rises above the firing potential (above region 85). Regenerative feedback latches the device on for output 82.

When timer 75 subsequently causes light source 74 to illuminate PC71 with a longer duration light pulse 83 of standard luminance, carriers in the PC attain high energy levels which, when the light input suddenly is shaded, sweep the conduction band of PC71 so free of carriers that photocurrent undershoot occurs. The high resistance 84 which accompanies undershoot lowers the effective voltage across neon 74 to a value below the cut-off potential (below region 85) whereupon the device goes dark and the latch condition disappears. The standard light sources in FIGS. 1, 4 and 7 may generally be ordinary lamps of reasonable intensity. The timers may be electronic timers having short and long durations selectable by external stimuli. Since photocurrent undershoot is a function of both duration and intensity of illumination, various fractional combinations of footcandles and seconds are effective. The combination of lamp and timer may be termed a footcandle-second timer. Two light signals are developed by the footcandle-second timer—a minimum footcandle-second light pulse to cause feedback and a maximum footcandle-second light pulse to cause photocurrent undershoot and destroy feedback. The minimum footcandle-second pulse sets the devices for luminant output in FIGS. 1, 3 and 7; it sets the device for dark output in FIG. 4.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In an optical feedback device, a photoconductor element of the type which exhibits photocurrent undershoot characteristics when illumination is raised and thereafter suddenly lowered, a luminor in electrical series with said photoconductor element physically positioned for optical feedback, electrical power means in series with said photoconductor and said luminor for maintaining potential at a level whereby said luminor normally is maintained at a potential other than its effective illuminating potential, whereby change in potential across said luminor switches said luminor for dark or luminant output, whereupon through feedback to said photoconductor the device tends to remain luminant, a light source coupled to said photoconductor, and a footcandle-second timer controlling said light source for producing characteristic pulse illuminations of said photoconductor to cause photocurrent undershoot of said photoconductor and extinguish the device.

2. A saturating feedback optical device according to claim 1 wherein said light source produces light of standard luminance and wherein said timer is effective to produce short duration pulses to latch the device on, and long duration pulses to cause current undershoot to unlatch the device at termination of the pulse.

3. An optical feedback device according to claim 1 wherein the photoconductor is cadmium selenide.

4. An optical feedback device according to claim 1 wherein the photoconductor is cadmium selenide with acceptors in the group consisting of copper and silver chlorine donors.

5. A limited feedback optical device according to claim 1, comprising in addition resistance means to bias the device slightly above the saturation feedback level, whereby the device normally persists luminant, but at termination of a characteristic pulse extinguishes and persists off during a standard time duration controlled by the photocurrent undershoot recovery time.

6. A limited feedback device according to claim 5, comprising a sandwich of a flat structural support, an electrode layer on said support, an electroluminescent phosphor layer adjacent said electrode layer, a limited transparency electrical insulator layer adjacent said phosphor layer, said insulator having an opening, a photoconductor layer adjacent said insulative layer extending through the opening in said insulator to contact said phosphor layer, a transparent conductor layer adjacent said photoconductor layer extending through the opening in said insulator to contact said phosphor layer, and means for connecting said electrode layer and both said photoconductor layer and transparent conductor layer across a source of power.

References Cited in the file of this patent

UNITED STATES PATENTS 2,837,661 Orthuber et al. _____ June 3, 1958
2,896,087 Kazan _____ July 21, 1959

OTHER REFERENCES

"The Photoelectric Cell," The General Electric Review, July 1954, pages 28, 29, 30 and 31.

"Analysis of Photoconductivity Applied to Cadmium Sulphide Type Photoconductors," Journal of Physics and Chemistry of Solids, volume 1, No. 4, 1957, pages 234–248.